(12) United States Patent
Nakamura et al.

(10) Patent No.: US 7,468,747 B2
(45) Date of Patent: Dec. 23, 2008

(54) IMAGE MANAGEMENT SYSTEM TO OBTAIN IMAGES OF PERSONS WITH OPEN EYES

(75) Inventors: Yoichi Nakamura, Kanagawa-ken (JP); Hiroshi Yamaguchi, Kanagawa-ken (JP); Jun Enomoto, Kanagawa-ken (JP); Mamoru Shinohara, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 639 days.

(21) Appl. No.: 10/852,195

(22) Filed: May 25, 2004

(65) Prior Publication Data

US 2004/0239777 A1   Dec. 2, 2004

(30) Foreign Application Priority Data

May 27, 2003   (JP)   ............................. 2003-148528

(51) Int. Cl.
    *H04N 5/262* (2006.01)
(52) U.S. Cl. ............... 348/239; 348/208.14; 348/222.1; 348/143; 348/169
(58) Field of Classification Search ................ 348/239, 348/208.14, 143, 169
    See application file for complete search history.

(56) References Cited

U.S. PATENT DOCUMENTS

| 5,926,518 A * | 7/1999 | Asokawa ................. 377/6 |
| 6,628,899 B1 | 9/2003 | Kito |
| 6,697,104 B1 * | 2/2004 | Yakobi et al. ............... 348/143 |
| 7,084,918 B2 * | 8/2006 | Robins et al. .......... 348/333.03 |
| 2002/0049728 A1 * | 4/2002 | Kaku ........................... 707/1 |
| 2002/0105672 A1 * | 8/2002 | Housel ..................... 358/1.15 |

\* cited by examiner

*Primary Examiner*—Lin Ye
*Assistant Examiner*—Gevell Selby
(74) *Attorney, Agent, or Firm*—Sughrue Mion, PLLC

(57) ABSTRACT

A subject user is photographed in a photographing system in a theme park. At this time, photographs are taken a plurality of times at a predetermined time interval. Further, an instruction is given to photograph a specified number of times according to a number of persons included in an image which will be photographed. It is judged whether or not persons included in a plurality of image data obtained by photographing have their eyes open. A single set of image data which is judged to include the persons with open eyes is sent to an image storage server and stored in the image storage server.

15 Claims, 9 Drawing Sheets

| NUMBER OF PERSONS (PERSONS) | NUMBER OF TIMES OF PHOTOGRAPHING(TIMES) |
|---|---|
| 1 | 2 |
| 3~5 | 5 |
| OVER 10 | 7 |

IMAGE MANAGEMENT SYSTEM TO OBTAIN IMAGES OF PERSONS WITH OPEN EYES

BACKGROUND OF THE INVENTION

1. Field of the Invention

The present invention relates to an image management system for storing and managing image data obtained by cameras installed at fixed points in a theme park, a photo studio or the like.

2. Description of the Related Art

In recent years, a print system has been proposed, wherein fixed-point cameras are installed in rides of a theme park or the like, photographs of visitors (subjects) are taken, image data obtained by photographing are output as prints and the obtained prints are handed over to the visitors. In the above-mentioned print system, since the prints are handed over to the visitors at each ride, the visitors need to wait at each ride till the prints are completed and that is troublesome for the visitors.

Therefore, a system has been proposed, wherein wireless tags such as wireless IC cards, on which ID information for specifying the visitors is recorded are given to the visitors and photographs are taken by a plurality of fixed-point cameras installed in the theme park (Refer to U.S. Pat. No. 6,628,899) The ID information is sent to communication devices installed together with the fixed-point cameras when photographs are taken and image data obtained by photographing are stored in an image server by relating the images data to the ID information in the system. Therefore, the visitors can refer to all of their images obtained in the theme park at once later by accessing the image server and retrieving the image data based on the ID information. Accordingly, troublesomeness that the visitors must wait to receive the prints at each ride can be solved. Further, in the system disclosed in U.S. Pat. No. 6,628,899, the visitors can also operate the fixed-point cameras by operating the wireless tags and photograph the images of themselves looking at the fixed-point cameras.

The visitors can obtain their own images photographed in the theme park in the system disclosed in U.S. Pat. No. 6,628,899. However, if a visitor blinks just when he/she is photographed by the fixed-point camera, the visitor with closed eyes is in the obtained image. The visitor normally does not want to purchase such an image of him/herself with closed eyes, however the visitor must reluctantly purchase the image of him/herself with closed eyes because the image photographed in the theme park will remind the visitor of the theme park. Alternatively, the visitor may give up purchasing the image and be photographed again by the fixed-point camera. However, the visitor is required to go back to the place where the fixed-point camera is installed or queue for the ride where the fixed-point camera is installed again. Therefore, retaking of the photograph is extremely troublesome for the visitor. Further, even if the photograph is taken again, there is a possibility that the obtained image also includes the visitor with closed eyes because the visitor may blink again just when the photograph is taken. Further, when an image is obtained by photographing the visitor with his/her friends, a plurality of persons is in the obtained image. If any one of them has his/her eyes closed in the image, the image is not preferable.

SUMMARY OF THE INVENTION

In view of the foregoing circumstances, it is an object of the present invention to make it possible to obtain images of persons with open eyes without being substantially affected by the blinks of the persons.

An image management system according to the present invention includes a photographing device including a photographing means installed at a fixed point, for obtaining image data representing an image of a person by photographing the person and an output means for outputting the image data, a photographing control device for controlling the photographing device so that the photographing device continuously photographs a plurality of times at a predetermined time interval and causing the photographing device to obtain a plurality of image data, an image selecting device including a judging means for judging whether or not a person included in each of a plurality of photograph images represented by each of the plurality of image data has his/her eyes open and a selecting means for selecting a single set of image data representing a photograph image of the person who is judged to have his/her eyes open and a storage device for storing the single set of data selected by the image selecting device.

The "predetermined time interval" means a time period which is longer than time required for a blink by a person and shorter than time from a blink to the next blink. Specifically, the time required for a blink by a person is approximately 0.25 second and the time from a blink to the next blink is approximately 5 seconds. Therefore, the "predetermined time interval" should be in a range of approximately 0.25 to 5 seconds. In the present invention, the photographs are continuously taken a plurality of times. Therefore, it is preferable that the "predetermined time interval" is approximately 0.3 second in considering that facial expressions of persons will not change in this period.

The image selecting device may be provided in the photographing device in the image management system according to the present invention.

Further, the image selecting device may be provided in the storage device in the image management system according to the present invention.

Further, the photographing control device may include a number-of-person counting means for counting a number of persons who will be photographed by the photographing device and an instructing means for instructing the photographing device to increase a number of times of photographing with increase of the number of persons counted by the number-of-person counting means in the image management system according to the present invention.

According the present invention, the photographing means in the photographing device takes photographs of persons. At this time, the photographing control device controls the photographing means so that the photographing means continuously photographs a plurality of times at a predetermined time interval and causes the photographing device to obtain a plurality of image data. Next, the judging means in the image selecting device judges whether or not a person included in each of a plurality of photograph images represented by each of the plurality of image data has his/her eyes open. The selecting means selects a single set of image data representing the photograph image of the person who is judged to have his/her eyes open. The selected single set of image data is stored in the storage device. Accordingly, only the image data representing an image of the person with open eyes are stored in the storage device. Therefore, troublesomeness that the persons must reluctantly purchase the image of the person with closed eyes or photographs must be taken again can be solved.

In the case that the image selecting unit is provided in the photographing device in the image management system, it is not required to send unnecessary image data representing images of persons with closed eyes to the storage device. Therefore, an amount of data sent from the photographing device to the storage device can be decreased.

In the case that the image selecting device is provided in the storage device in the image management system, it is possible to simplify the configuration of the photographing device.

The number-of-person counting means counts a number of persons who will be photographed by the photographing device and the instructing means instructs the photographing device to increase a number of times of photographing with increase of the number of persons in the image management system. At this time, when the number of persons who will be photographed increases, intervals of timing of blinks by each of the persons become irregular. Hence, if the number of times of photographing is small, a possibility that a person in a photograph image has his/her eyes closed increases. Therefore, a possibility of obtaining a photograph image including only persons with open eyes can be increased by increasing the number of times of photographing with increase of the number of persons.

DESCRIPTION OF THE PREFERRED EMBODIMENTS

Figure 1:
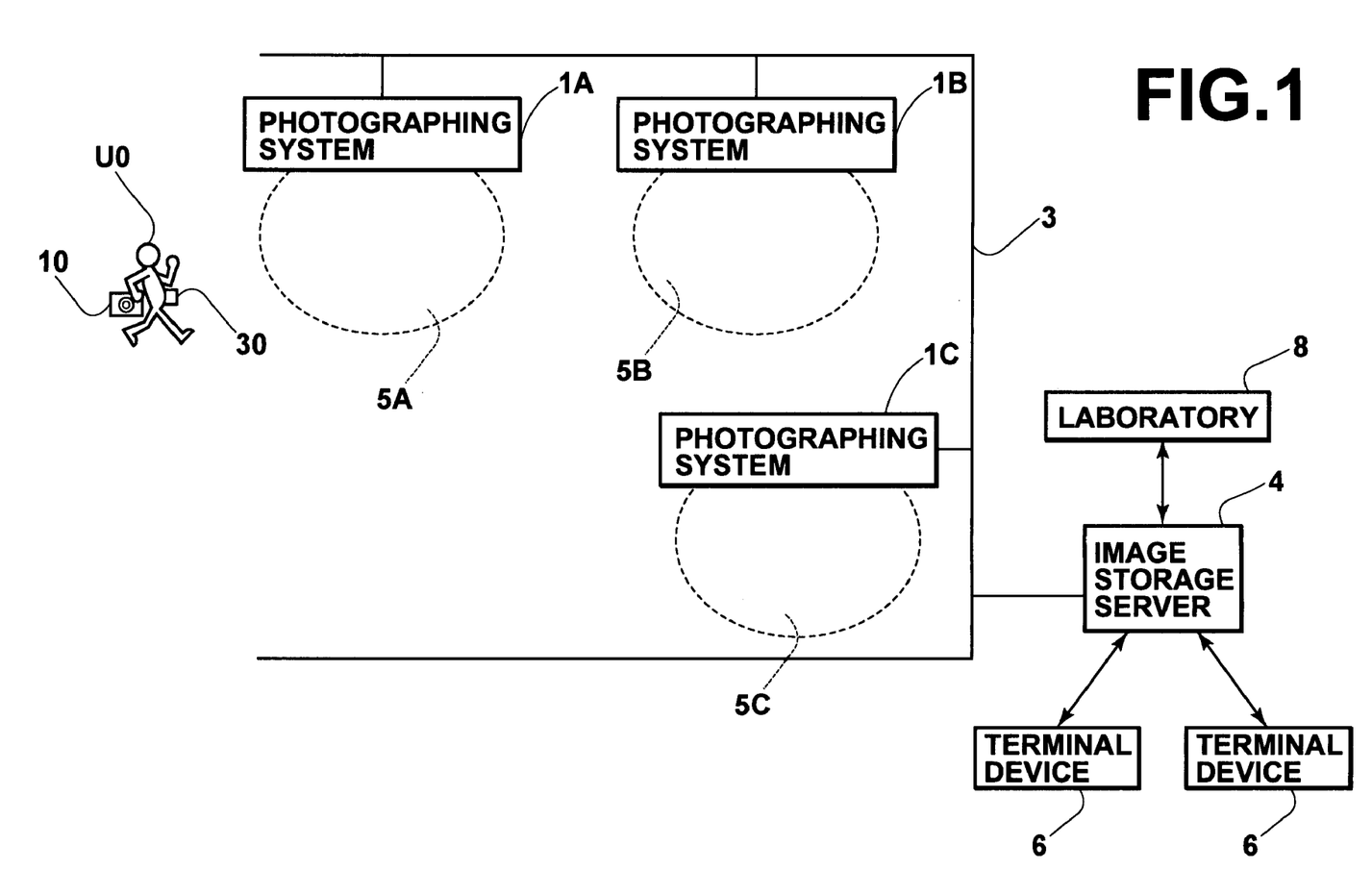
FIG. 1 shows a schematic block diagram illustrating a configuration of an image management system according to an embodiment of the present invention.

Hereinafter, embodiments of the present invention will be described with reference to drawings. FIG. 1 shows a schematic block diagram illustrating a configuration of an image management system according to an embodiment of the present invention. The image management system according to the present invention is installed in a theme park. The image management system includes a plurality (three in this case) of photographing systems 1A, 1B and 1C installed in the theme park, for obtaining image data S1 representing an image of a subject by photographing a person (hereinafter called subject user U0) who is a visitor to the theme park as the subject and an image storage server 4 connected to the photographing systems 1A, 1B and 1C via a network 3, as illustrated in FIG. 1. The image storage server 4 is connected to a terminal device 6 such as a personal computer, a cellular phone and a PDA carried by the subject user U0 and a laboratory 8 for printing out the image data S1, creating an album, recording the image data S1 on a CD-R or the like via the network 3. The image storage server 4 stores user ID recorded in a wireless tag 30 which will be described later and user information such as a name and an address of the user by relating the user ID and the user information.

The subject user U0 carries a digital camera 10 and the wireless tag 30. When the subject user U0 moves in the theme park, the subject user U0 is photographed by the photographing systems 1A, 1B and 1C.

The wireless tag 30 is given to the subject user U0 when the subject user U0 enters the theme park.

Figure 2:
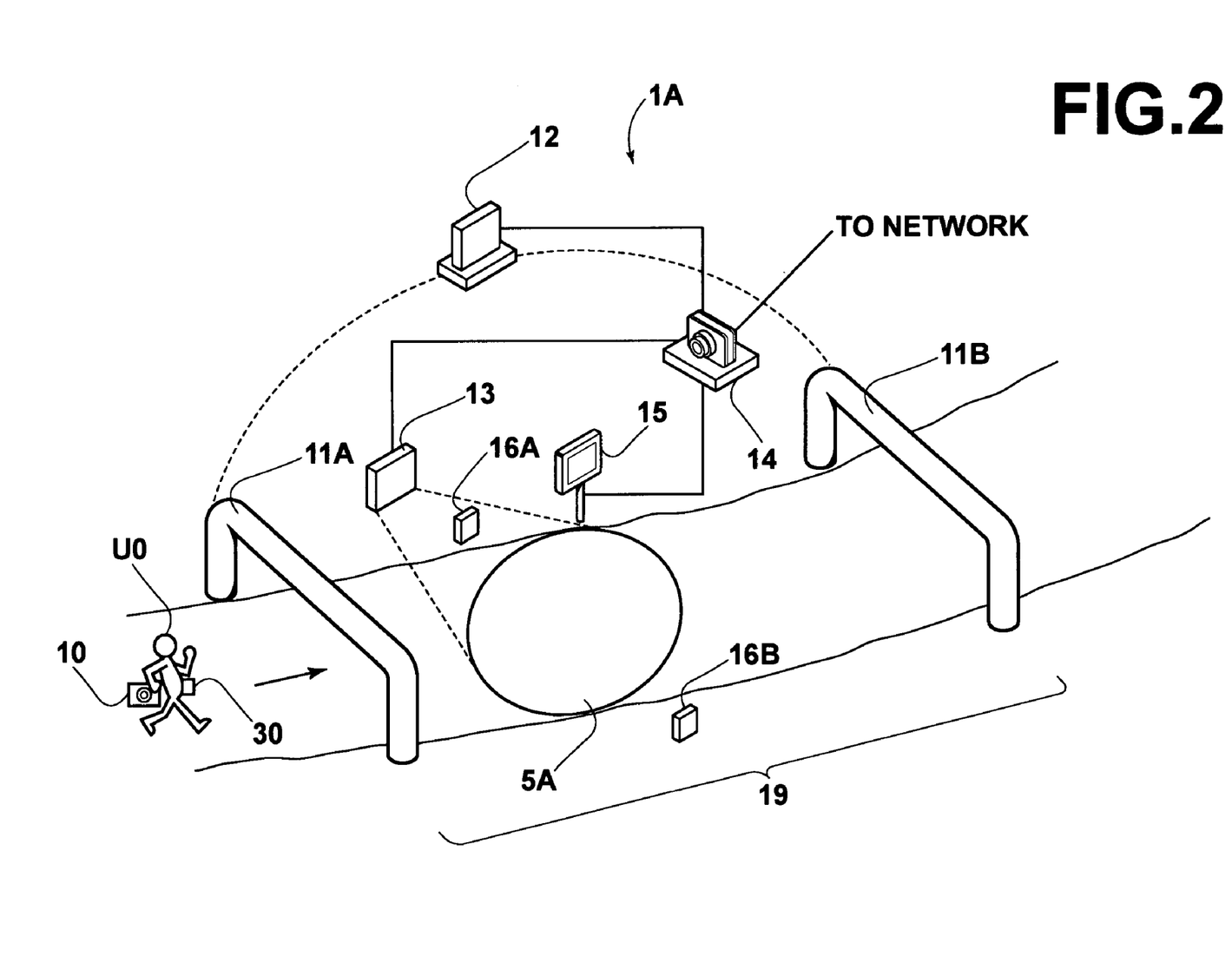
FIG. 2 shows a schematic perspective view illustrating a configuration of a photographing system.

FIG. 2 shows a schematic prospective view illustrating a configuration of a photographing system. Since configurations of the photographing systems 1A, 1B and 1C are identical, only the configuration of the photographing system 1A will be described. The photographing system 1A is a system for photographing the subject user U0 existing in a photographing area 5A in the theme park as illustrated in FIG. 2. The photographing system 1A includes gates 11A and 11B for counting a number of visitors who are entering the photographing area 5A, a wide-area sensor 12 for counting a number of subject users U0 who are existing in an area 19 between the gates 11A and 11B and carrying the wireless tags 30, a communication device 13 for communicating with the subject user U0 who is existing in the photographing area 5A and carrying the wireless tag 30, a photographing device 14 for photographing the subject user U0, a display tool 15 for displaying a photographing instruction to the subject user U0, the image data S1 obtained by the photographing device 14 or the like and person sensors 16A and 16B such as infrared sensors and ultrasonic sensors, for detecting the subject user U0 existing in the photographing area 5A to capture the subject user U0 by using the photographing device 14.

The gates 11A and 11B count the number of persons who enter the area 19 regardless of whether or not the persons carry the wireless tags 30. The counted number is input to a system (not illustrated) of the theme park, which is installed together with the image storage server 4 and used to know the number of visitors who entered the area 19, for example. The counted number is also input to the photographing device 14 as information representing the number of visitors who entered the area 19 and used for controlling photographing operations.

An arbitrarily configured device which can count the number of persons, such as a device for counting the number of persons by using an electric light and a device for counting the number of persons by setting up a rotatable bar and allowing passage of the persons only if the persons rotate the bar may be used as the gates 11A and 11B.

Figure 3:
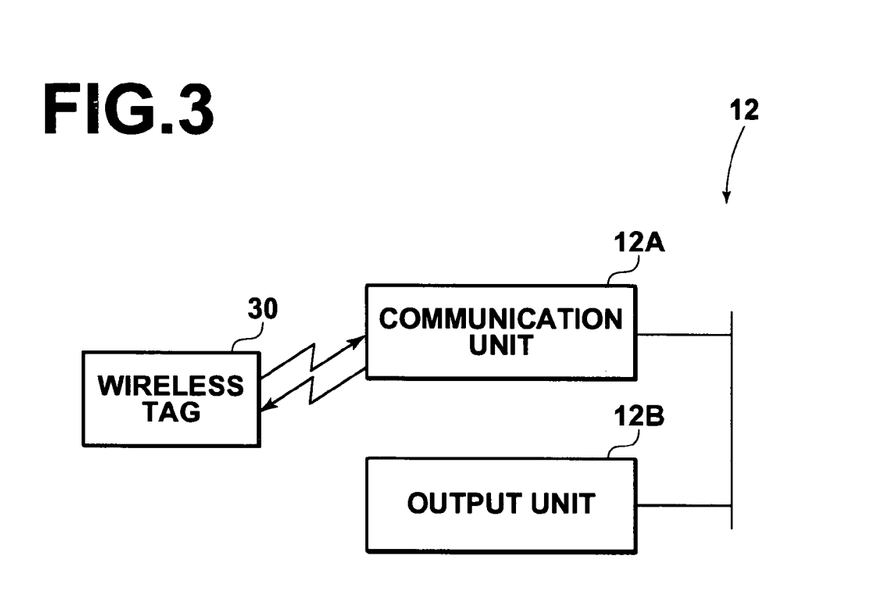
FIG. 3 shows a schematic block diagram illustrating a configuration of a wide-area sensor.

The wide-area sensor 12 detects the subject user U0 who exists in the area 19 and carries the wireless tag 30. FIG. 3 shows a schematic block diagram illustrating a configuration of the wide-area sensor 12. As illustrated in FIG. 3, the wide-area sensor 12 includes a communication unit 12A for originating query signals representing query information at a predetermined time interval and receiving reply signals to the query signals, sent from the wireless tag 30 and an output unit 12B for outputting information representing that the reply signals have been received and reply information represented by the reply signals to the photographing device 14.

Figure 4:
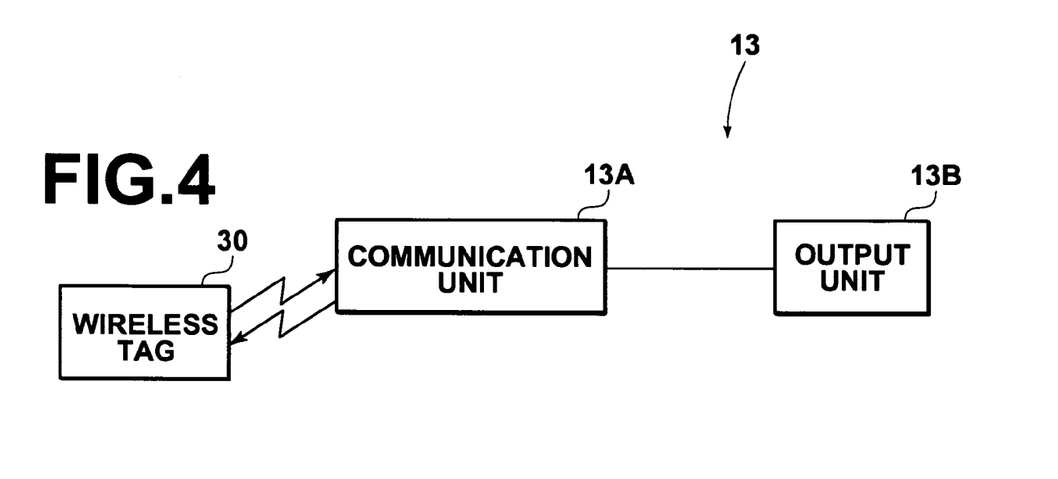
FIG. 4 shows a schematic block diagram illustrating a configuration of a communication device.

The communication device 13 communicates with the subject user U0 who exists in the photographing area 5A and carries the wireless tag 30. FIG. 4 shows a schematic block diagram illustrating a configuration of the communication device 13. As illustrated in FIG. 4, the communication device 13 includes a communication unit 13A for originating query signals representing query information at a predetermined time interval and receiving reply signals to the query signals, sent from the wireless tag 30 and also a photographing instruction signal sent from the wireless tag 30 and an output unit 13B for outputting the reply signal received by the communication unit 13A to the photographing device 14.

The reply information represented by the reply signal sent by the wireless tag 30 includes user ID for specifying the subject user U0. The user ID is a unique number for the subject user U0. A number stored in the wireless tag 30 in advance may be used as the user ID. Alternatively, when the wireless tag 30 is given to the subject user U0, a number or sign which the subject user U0 likes may be stored in the wireless tag 30 as the user ID.

Figure 5:
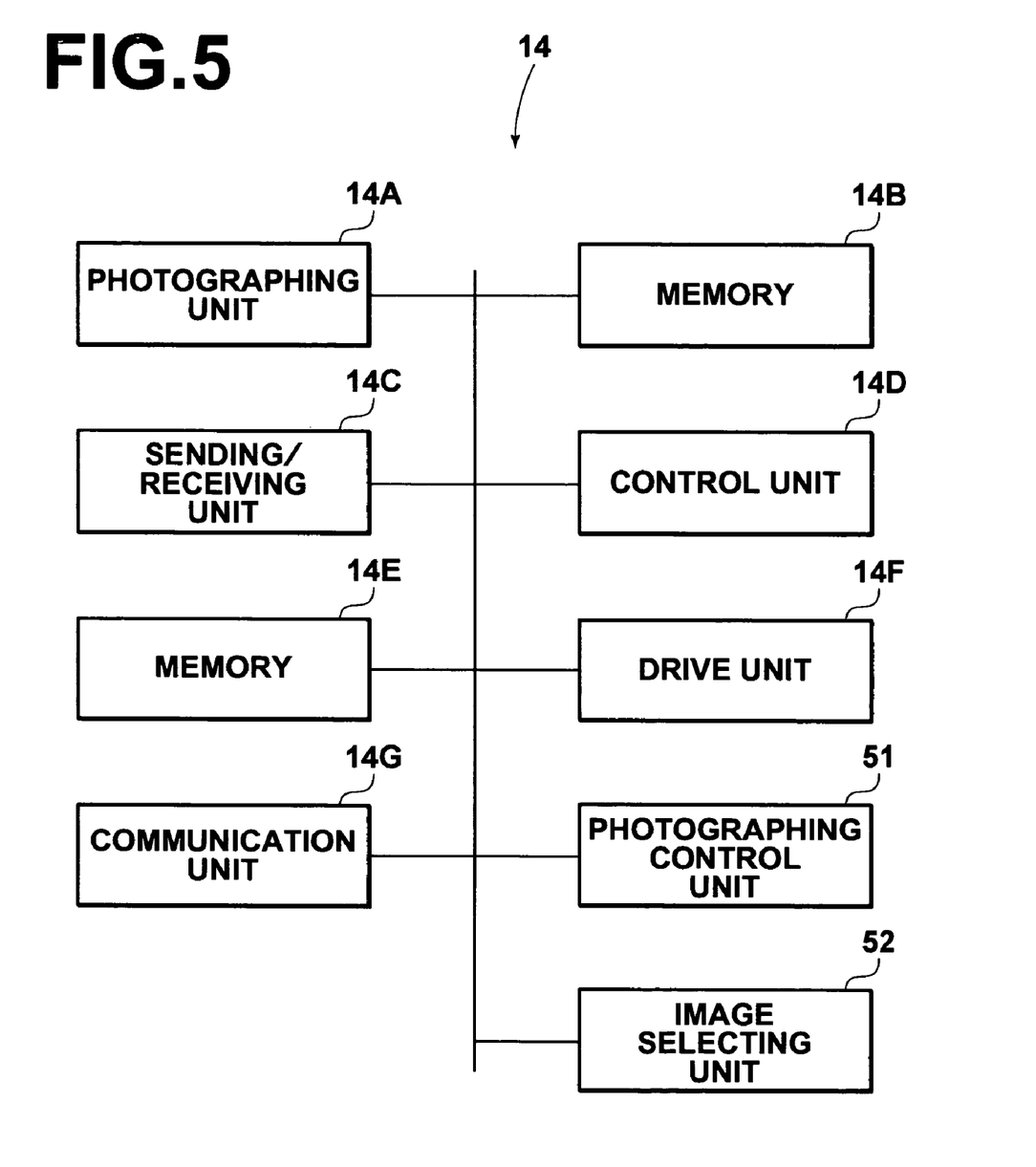
FIG. 5 shows a schematic block diagram illustrating a configuration of a photographing device.

FIG. 5 shows a schematic block diagram illustrating a configuration of the photographing device. As illustrated in FIG. 5, the photographing device 14 is a digital camera. The photographing device 14 includes a photographing unit 14A for obtaining the image data S1 by photographing, a first memory 14B for temporarily storing the image data S1, a sending/receiving unit 14C for sending a signal to and receiving a signal from the gates 11A and 11B, the wide-area sensor 12, the communication device 13, a display tool 15 and the person sensors 16A and 16B, a control unit 14D for controlling drive of the photographing device 14, a second memory 14E for storing a control program and various information, a drive unit 14F for causing the photographing unit 14A to pan and tilt, a communication unit 14G connected to the network 3, a photographing control unit 51 for particularly controlling photographing by the photographing unit 14A and an image selecting unit 52 for selecting a single set of image data S1 from a plurality of image data S1$i$ ($i$=1 to N, N is a number of times of photographing, which will be described later) photographed by the photographing unit 14A as will be described later.

In the photographing device 14, the control unit 14D sets the photographing unit 14A in a waiting state wherein the photographing unit 14A can immediately photograph, based on information sent from the wide-area sensor 12 to the photographing device 14, representing that the wide-area sensor 12 has received the reply signal.

Further, the control unit 14D obtains the number of persons who entered the area 19 and switches photographing modes of the photographing unit 14A based on information representing the number of persons who entered the area 19, counted by the gates 11A and 11B. Specifically, the control unit 14D compares the number of persons who entered the area 19 with a threshold value Th1. If the number of the persons who entered the area 19 is less than the threshold value Th1 and a state is appropriate for automatic photographing, the control unit 14D switches the photographing mode to an automatic photographing mode. If the number of persons who entered becomes equal to or larger than the threshold value Th1 and it becomes difficult to specify a single subject user U0 for photographing, the control unit 14D switches the photographing modes to wait for photographing.

When the number of persons who entered has become equal to or larger than the threshold value Th1, there is a possibility that a plurality of subject users U0 who carry the wireless tags 30 exist in the photographing area 5A and it is difficult to specify a single subject user U0. Therefore, the subject user U0 may change the photographing mode to a manual mode by operating the wireless tag 30. In this case, the photographing device 14 sends an instruction signal for making the subject user U0 photograph at the time of photographing to the display tool 15. Further, the reply information represented by the reply signal sent from the wireless tag 30 includes the user ID. Therefore, the photographing modes may be switched either to a photographing mode of photographing by calling a subject user U0 who will be photographed, from the display tool 15, based on the user ID or a photographing mode of photographing the subject user U0 after notifying other persons besides the subject user U0 who will be photographed to leave the photographing area 5A. In the description of the present embodiment, it is assumed that the photographing mode is switched to the manual photographing mode. Further, it is also possible to call the subject user U0 to inform that a photograph of the subject user U0 will be taken at the time of photographing in the manual photographing mode.

It is required to inform the subject user U0 who will be photographed that the subject user U0 him/herself will be photographed in a photographing mode of making the subject user U0 give a photographing instruction and a photographing mode of photographing by calling the subject user U0. Therefore, the control unit 14D accesses the image storage server 4 and obtains information representing a user's name by referring to user information based on the user ID included in the reply information. The control unit 14D sends the obtained information to the display tool 15 which will be described later.

Further, the photographing device 14 sends the reply information represented by the reply signal sent by the communication device 13 and the image data S1 obtained by photographing from the sending/receiving unit 14C to the image storage server 4. The image data S1 obtained by photographing may be sent to the display tool 15 and displayed on the display tool 15.

Further, the photographing device 14 knows a position of the subject user U0 in the photographing area 5A based on signals sent from the person sensors 16A and 16B. The photographing device 14 drives the drive unit 14F and causes the photographing unit 14A to pan and tilt so that the subject user U0 is in an angle of view of the photographing unit 14A.

Figure 6:
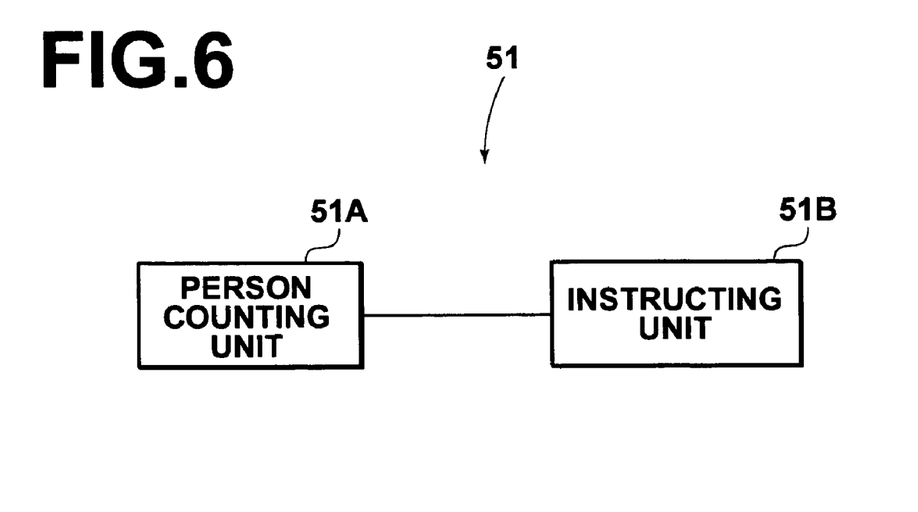
FIG. 6 shows a schematic block diagram illustrating a configuration of a photographing control unit.

FIG. 6 shows a schematic block diagram illustrating the photographing control unit 51. The photographing control unit 51 includes a number-of-person counting unit 51A for counting a number of persons included in an image (hereinafter called monitor image) which is monitored to be photographed by the photographing unit 14A and an instruction unit 51B for instructing the photographing unit 14A to increase a number of times of photographing with increase of the number of persons counted by the number-of-person counting unit 51A.

The number-of-person counting unit 51A extracts images of facial parts (facial images) of persons included in the monitor image. The facial images are extracted by a method disclosed in Japanese Unexamined Patent Publication No. 2000-48184, for example. Specifically, preprocessing such as pixel reduction and brightness control is performed on the monitor image to extract facial areas and flesh pixels are detected in the preprocessed monitor image. Projected distribution of the flesh pixels is obtained based on the detection result of the flesh pixels. Then, facial area candidates are found by retrieving flesh mass areas which are characteristics of the facial areas based on a shape of the projected distribution of the flesh pixels. Finally, it is judge whether or not the facial area candidates are the facial areas based on a predetermined method using a neutral network or the like and the facial images are extracted. Then, the extracted facial images are counted and the counted number is used as a number of persons included in the image which will be photographed.

Figure 7:
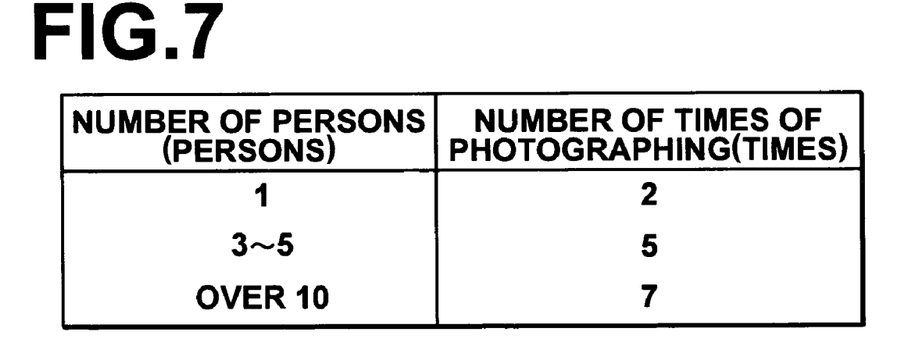
FIG. 7 illustrates an example of a correspondence table between numbers of persons and numbers of times of photographing.

The instruction unit 51B stores a correspondence table between the number of persons counted by the number-of-person counting unit 51A and the number of times of photographing. The instruction unit 51B sets a number of times of photographing by the photographing unit 14A by referring to the table. FIG. 7 illustrates an example of the correspondence table between the number of persons and the number of times of photographing. The number of times of photographing is set by referring to the table illustrated in FIG. 7. If one person is included in the image which will be photographed, two times is set as the number of times of photographing. If three to five persons are included in the image, five times is set as the number of times of photographing. If ten or more persons are included in the image, seven times is set as the number of times of photographing. Then, the instruction unit 51B instructs the photographing unit 14A to photograph the set number of times.

The photographing unit 14A photographs the number of times as instructed by the instruction unit 51B. At this time, a plurality of image data S1$i$ are obtained by photographing at a predetermined time interval which is longer than time required for a blink by a person and shorter than time from a blink to the next blink. Specifically, the time required for a blink by a person is approximately 0.25 second and time from a blink to the next blink is approximately 5 seconds. The plurality of image data S1$i$ are obtained by photographing at a predetermined time interval of 0.3 second in considering that facial expressions of persons will not change in this period.

Figure 8:
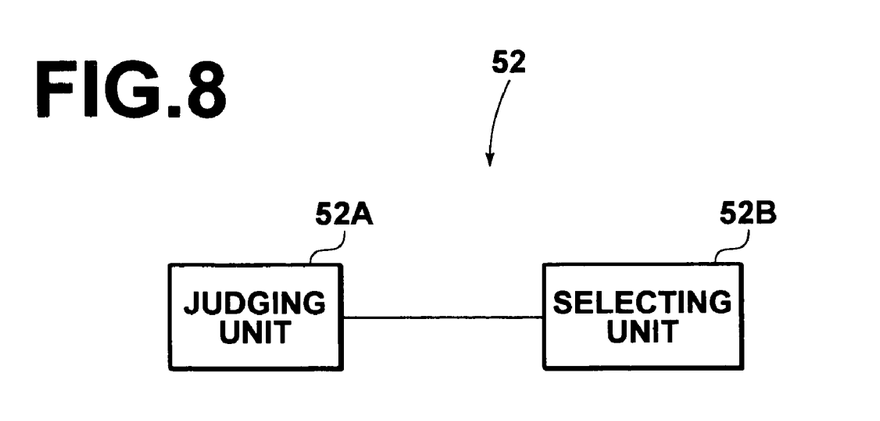
FIG. 8 shows a schematic block diagram illustrating a configuration of an image selecting unit.

FIG. 8 shows a schematic block diagram illustrating a configuration of the image selecting unit 52. The image selecting unit 52 includes a judging unit 52A for judging whether or not a person in each of N number of photograph images G1$i$ represented by each of N number of image data S1$i$ corresponding to the number of times of photographing, obtained by the photographing unit 14A has his/her eyes open and a selecting unit 52B for selecting a single set of image data S1 representing a photograph image of the person who is judged to have his/her eyes open by the judging unit 52A.

A judging unit 53A sequentially reads out the N number of image data S1$i$ which have been obtained by the photographing unit 14A and stored in the memory 14B and judges whether or not persons included in the photograph images G1$i$ represented by the read-out image data S1$i$ have their eyes open. The judgment on whether or not the persons have their eyes open will be described below.

First, the judging unit 51A extracts facial images of persons from the photograph images G1$i$. The facial images are extracted in a same manner with the method performed by the number-of-person counting unit 51A of the photographing control unit 51. Meanwhile, a technique for extracting an eye area, which is used for detecting red eyes, may be applied to the judgment on whether or not the persons have their eyes open. For example, first, a brightness histogram of images of facial parts which have been extracted as described above is created and a low brightness area of the histogram is extracted from the brightness histogram. The extracted low brightness area is contracted and an entire area of eyes is extracted. Then, a size of the extracted area of eyes is obtained. If the size of the area of eyes is equal to or larger than a predetermine threshold value, it is judged that the persons have their eyes open.

In the case that a plurality of persons are included in a single photograph image G1$i$, if all of the persons have their eyes open, the photograph image G1$i$ is judged as an image of persons with open eyes. On the contrary, in the case that a part of the plurality of persons have their eyes closed, if a number of persons with open eyes is larger than a number of persons with closed eyes, the photograph image G1$i$ is judged as an image of persons with open eyes.

The selecting unit 52B selects the image data S1$i$ representing the photograph image G1$i$ which has been judged to include the persons with open eyes by the judging unit 52A as the image data S1 sent to the image storage server 4. If there is a plurality of image data S1$i$ representing the photograph images G1$i$ which have been judged to include the persons with open eyes, image data S1$i$ of which photographing time is most recent are selected as the image data S1, for example.

The image data S1 selected by the image selecting unit 52 are sent to the image storage server 4 together with reply information represented by a reply signal sent by the communication device 13, photographing date/time information representing photographing date/time and installation place information representing an installation place of the photographing system 1A. The reply information, photographing date/time information and installation place information may be also sent to the image storage server 4 as a separate file from the image data S1. The reply information, photographing date/time information and installation place information may be described in a tag of the image data S1 and sent to the image storage server 4 together with the image data S1. It is assumed that the reply information, photographing date/time information and installation place information is described in the tag of the image data S1 in the present embodiment.

Figure 9:
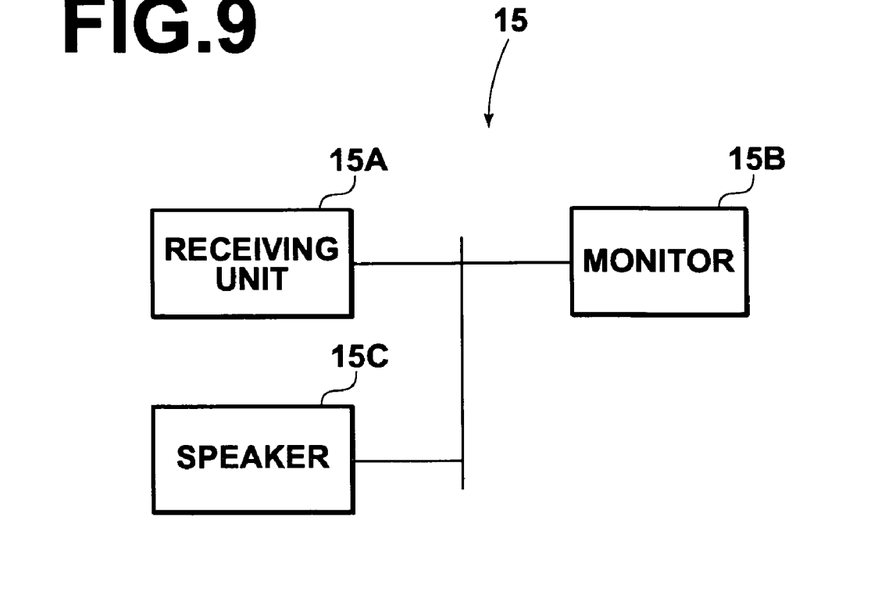
FIG. 9 shows a schematic block diagram illustrating a configuration of a display tool.

FIG. 9 shows a schematic block diagram illustrating a configuration of a display tool. The display tool 15 includes a receiving unit 15A for receiving an instruction signal representing various instructions and image data sent from the photographing device 14, a monitor 15B for displaying the image data S1 and various information and a speaker 15C for outputting a voice to instruct the subject user U0 to photograph or the like based on the instruction signal, as illustrated in FIG. 9.

Here, if the photographing mode set in the photographing device 14 is a mode of calling the subject user U0 such as a manual mode or a mode of photographing after calling the subject user U0 as described above, the photographing device 14 instructs the display tool 15 to call the subject user U0. Then, the display tool 15 outputs a voice which specifies the subject user U0, such as "○○ (boy's name), here we go now!" and "×× (girl's name), press the photograph button!".

The person sensors 16A and 16B detect the position of the subject user U0 in the photographing area 5A and send a position signal representing the position of the subject user U0 to the photographing device 14 so that the position information is used for panning and tilting by the photographing device 14. Two person sensors 16A and 16B are provided in FIG. 2. However, three or more person sensors may be provided to improve accuracy in detecting the position of the subject user U0.

Figure 10:
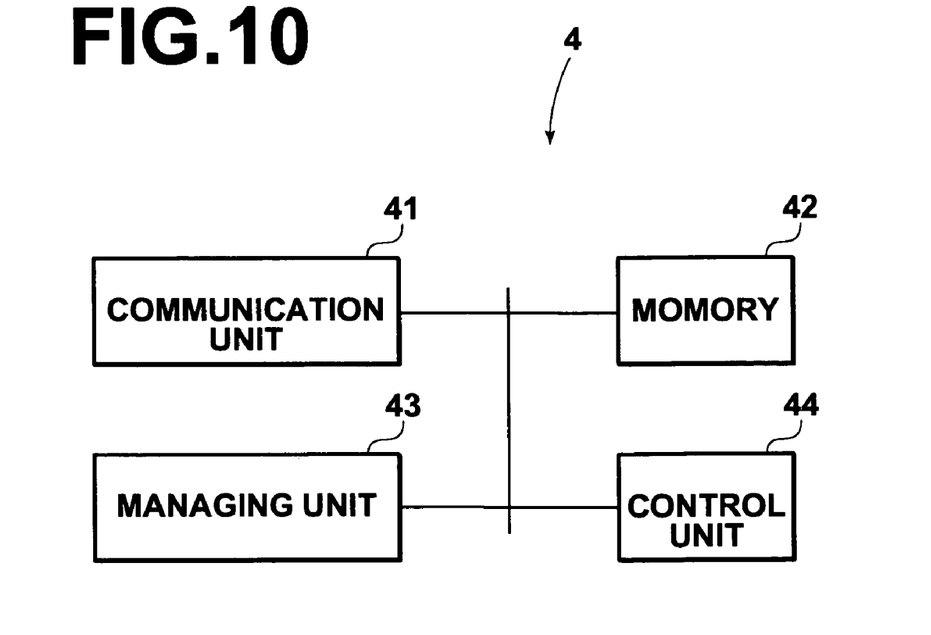
FIG. 10 shows a schematic block diagram illustrating a configuration of an image storage server.

FIG. 10 shows a schematic block diagram illustrating a configuration of the image storage server. The image storage server 4 includes a communication unit 41 for communicating with the photographing systems 1A, 1B and 1C, the terminal device 6 carried by the subject user U0 and the laboratory 8 via the network 3, a memory 42 with a large capacity, for storing various information such as the image data S1, a database DB1 for retrieval, a control program of the image storage server 4 and a user database DB2 showing correspondence between the user ID and the user information, a managing unit 43 for managing the image data S1 stored in the memory 42 by creating a database DB1 which will be stored in the memory 42 and a control unit 44 for controlling drive of the image storage server 4, as illustrated in FIG. 10.

The managing unit 43 creates the database DB1 based on information (tag information) described in a tag of the image data S1 sent from the photographing systems 1A, 1B and 1C. The tag information of the image data S1 includes a file name of the image data S1, the user ID of the subject user U0, represented by the reply information, the photographing date/time information, the installation place information, a camera ID and photographing information.

The photographing information includes whether or not a stroboscope was used at the time of photographing, a zoom magnification ratio and an amount of panning and tilting.

Then, the managing unit 43 sorts the image data S1 based on the user ID of the subject user U0, included in the tag information provided for the image data S1 so that the image data S1 are sorted into image data for each subject user U0. Further, the managing unit 43 sorts the image data S1 in a chronological order of the photographing date/times based on the photographing date/time information described in the tag information of the image data S1 and the database DB1 is created.

When the terminal device 6 accesses the image storage server 4, the control unit 44 of the image storage server 4 searches the database DB1 based on the user ID which has been input to the terminal device 6 by the subject user U0 and permits the accessed terminal device 6 to browse the sorted image data S1 with the user ID. The subject user U0 sends a request for downloading the image data S1, a request for creating an album, a request for creating a CD-R and an order for printing to the image storage server 4 by operating the terminal device 6.

Figure 11:
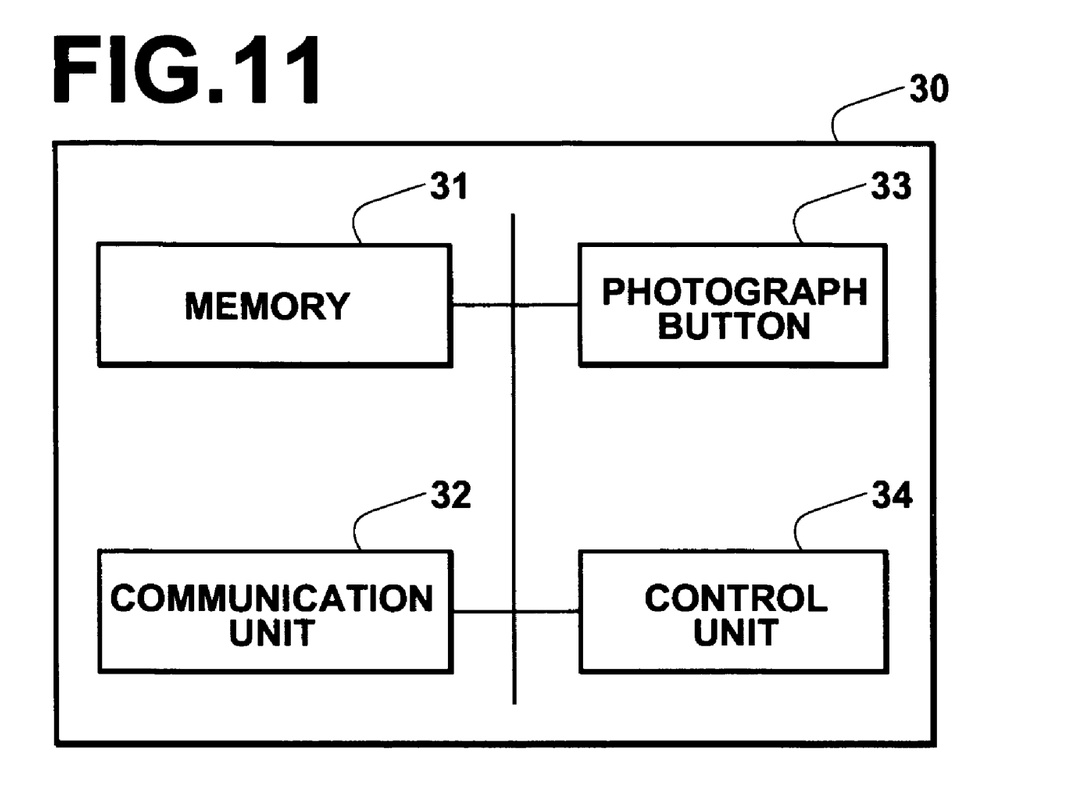
FIG. 11 shows a schematic block diagram illustrating a configuration of a wireless tag.

FIG. 11 shows a schematic block diagram illustrating a configuration of the wireless tag 30. The wireless tag 30 includes a memory 31 for storing the user ID or the like to specify the subject user U0 carrying the wireless tag 30, a communication unit 32 for receiving a query signal and sending a reply signal representing reply information including the user ID and a photographing instruction signal, a photograph button 33 for giving a photographing instruction at the time of manual photographing and a control unit 34 for controlling drive of the wireless tag 30, as illustrated in FIG. 11. The wireless tag 30 is card-shaped so that the subject user U0 can easily carry the wireless tag 30. When the photograph button 33 is pressed down, the photographing instruction signal for giving the photographing instruction is sent from the communication unit 32 to the communication device 13.

An example of the wireless tag 30 is a RFID tag for long distance communication, which has a built-in battery and of which communication distance is a several meters or longer. The wireless tag 30 is distributed to the subject user U0 (visitor to the theme park) who wants to be photographed by the photographing systems 1A, 1B and 1C. In this case, a name of the subject user U0 can be specified based on the subject user U0 by registering a name, an address, a telephone number and the like of the subject user U0 in the user database DB2 of the image storage server 4. Therefore, it becomes possible to output the voice which specifies the subject user U0 from the display tool 15 at the time of photographing as described above.

Figure 12:
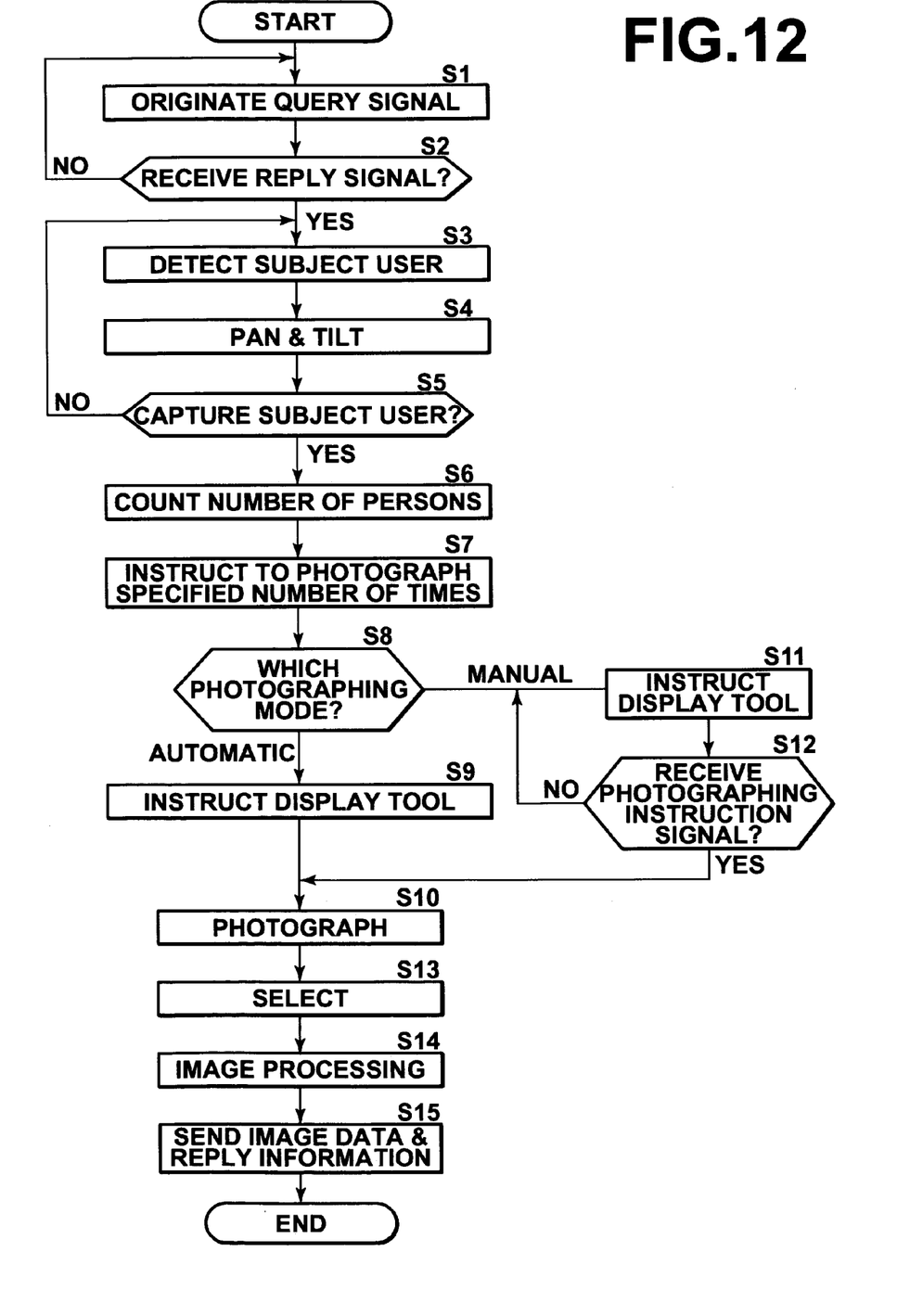
FIG. 12 shows a flow chart of processing performed at the time of photographing in a present embodiment of the present invention.

Next, processing performed in the present embodiment will be described. FIG. 12 shows a flow chart of the processing performed in the present embodiment. Here, the processing performed in the photographing system 1A will be described.

The control unit 14D of the photographing device 14 constantly originates a query signal to the communication device 13 at a predetermined time interval (step S1) and further monitors whether or not the communication device 13 has received a reply signal to the query signal, from the wireless tag 30 of the subject user U0 existing in the photographing area 5A (step S2). If step S2 is YES, the subject user U0 in the photographing area 5A is detected by the person sensors 16A and 16B (step S3). The photographing unit 14A pans and tilts to capture the subject user U0 (step S4).

Then, the control unit 14D judges whether or not the photographing unit 14A has captured the subject user U0 (step S5). If step S5 is NO, the processing returns to step S3. If step S5 is YES, the photographing control unit 51 counts a number of persons included in a monitor image monitored by the photographing unit 14A (step S6) and instructs the photographing unit 14A to photograph a number of times according to the counted number of persons (step S7).

Next, the control unit 14D judges whether or not the photographing mode is an automatic photographing mode or a manual photographing mode (step S8). If the number of the subject users U0 in the area 19, counted by the wide-area sensor 12 is equal to or more than the predetermined threshold value Th1, the photographing mode is switched to the manual photographing mode. If the number of the subject users U0 is less than the threshold value Th1, the photographing mode is switched to the automatic photographing mode.

In the case that the photographing mode is the automatic photographing mode, the control unit 14D instructs the display tool 15 to display that a photograph will be taken (step S9). The photographing unit 14A photographs the number of times, specified in the instruction, in timing with the voice for instructing to photograph, output from the display tool 15 and obtains the plurality of image data S1$i$ (step S10).

In the case that the photographing mode is the manual photographing mode, the control unit 14D instructs the display tool 15 to make the subject user U0 press the photograph button 33 of the wireless tag 30 (step S11). Then, the control unit 14D starts to monitor whether or not the subject user U0 has pressed the photograph button 33 and the communication device 13 has received the photographing instruction signal sent from the wireless tag 30 (step S12). If step S12 is YES, the processing goes to step S10, and the photographing unit 14A photographs the number of times specified in the instruction and obtains a plurality of image data S1$i$ (step S10).

Next, the image selecting unit 52 selects the image data S1$i$ representing the photograph image G1$i$ which has been judged as the image of the persons with open eyes as the image data S1 to be sent to the image storage server 4 from the plurality of image data S1$i$ (step S13). Then, an image processing unit 14H performs image processing on the image data S1 and obtains the processed image data S1 (step S14). Next, the control unit 14D sends the image data S1 on which image processing has be performed and reply information represented by the reply signal sent from the wireless tag 30, to the image storage server 4 via the communication unit 14G (step S15) and the processing ends.

The managing unit 43 creates the database DB1 from the tag information of the image data S1 sent from the photographing systems 1A, 1B and 1C in the image storage server 4.

Figure 13:
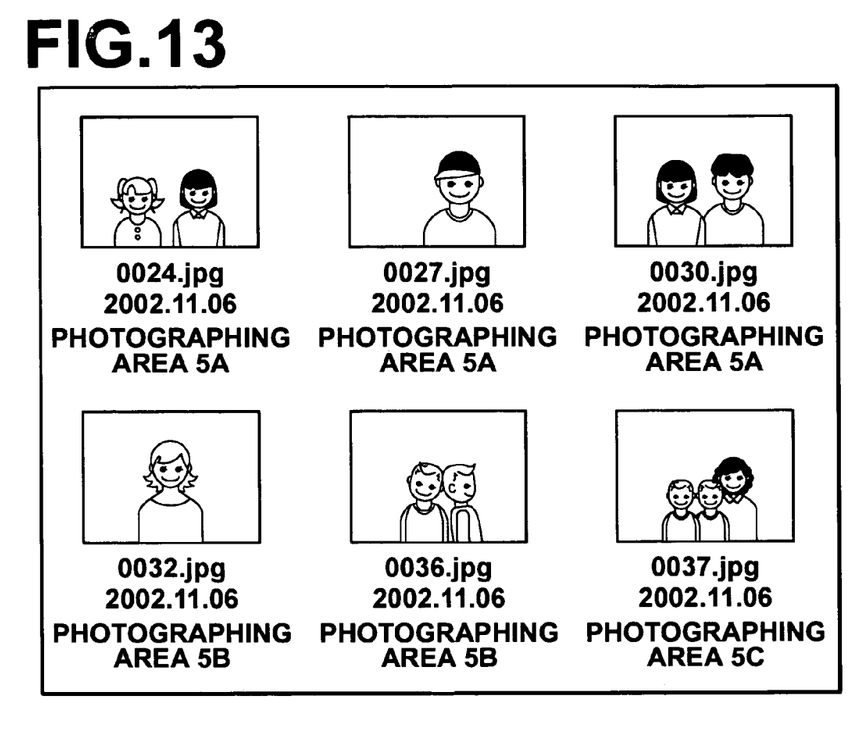
FIG. 13 illustrates a list of thumbnail images.

When the subject user U0 accesses the image storage server 4 from the terminal device 6 and sends the user ID to the image storage server 4 later, the control unit 44 searches the database DB1 stored in the memory 42 by using the user ID as a key and displays the sorted image data S1 with the user ID on the terminal device 6. Specifically, a list of thumbnail images of the image data S1 sorted in a file name order as illustrated in FIG. 13 for example is displayed on the terminal device 6. The list of thumbnail images includes file names, photographing date/times and photographing area names.

The subject user U0 selects a thumbnail image of which printing or recording on a CD-R should be ordered from the list of thumbnail images and sends an order instruction to the image storage server 4. The subject user U0 may also download the image data S1 which the subject user U0 likes and create an album by him/herself.

In the case that the subject user U0 sends the order to the image storage server 4, the image storage server 4 sends the ordered image data S1 to the laboratory 8. The image data S1 are printed out or recorded on a CD-R in the laboratory 8 according to the orders.

As described above, in the present embodiment, the photographing unit 14A is controlled so that the photographing unit 14A continuously photographs a plurality of times at a predetermined time interval at the time of photographing and a plurality of image data S1$i$ are obtained. Then, it is judged if persons included in each of a plurality of photograph images G1$i$ represented by each of the plurality of image data S1$i$ have their eyes open and a single set of image data S1 representing the photograph image G1$i$ including persons who are judged to have their eyes open is selected. The selected image data S1 are sent to the image storage server 4. Therefore, only the image data representing an image of persons with open eyes are stored in the image storage server 4. Accordingly, the troublesomeness that the subject user U0 must reluctantly purchase an image of him/herself with closed eyes or photographs must be taken again can be solved.

Further, since the image selecting unit 52 is provided in the photographing device 14, it is not required to send unnecessary image data representing images of persons with closed eyes to the image storage server 4. Therefore, an amount of data sent from the photographing device 14 to the image storage server 4 can be reduced.

Further, the number-of-person counting means 51A of the photographing control unit 51 counts a number of persons who will be photographed by the photographing unit 14A and instructs the photographing unit 14A to increase a number of times of photographing with increase of the number of persons. Therefore, a possibility of obtaining a photograph image including only persons with open eyes can be increased.

Figure 14:
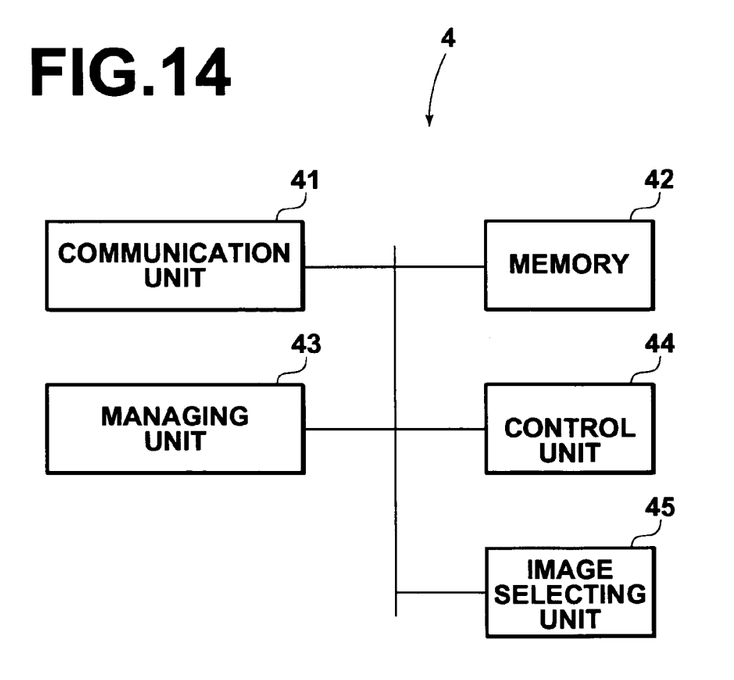
FIG. 14 shows a schematic block diagram illustrating another configuration of the image storage server.

In the above-mentioned embodiment, the image selecting means 52 is provided in the photographing device 14. However, an image selecting unit 45 which has the same function with the image selecting unit 52 may be provided in the image storage server 4. In this case, the photographing device 14 sends all of the image data S1$i$ obtained by photographing to the image storage server 4. The image selecting unit 45 selects the image data S1 representing photograph images of persons with open eyes and stores the selected image data S1 in the image storage server 4.

Accordingly, it is not required to provide the image selecting unit 52 in the photographing device 14, the configuration of the photographing device 14 which is often installed outdoors can be simplified.

Further, in the above-mentioned embodiment, the photographing control unit 51 instructs the photographing unit 14A to photograph the number of times according to the number of persons included in the monitor image which will be photographed by the photographing unit 14A. However, the number of times of photographing is not particularly limited to this number. Alternatively, the photographing control unit 51 may instruct the photographing unit 14A to photograph a predetermined number of times.

What is claimed is:

1. An image management system comprising:
    a photographing device including a photographing means installed at a fixed point, for obtaining image data representing an image of a person by photographing the person and an output means for outputting the image data;
    a photographing control device for controlling the photographing means so that the photographing means continuously photographs a plurality of times at a predetermined time interval and causing the photographing device to obtain a plurality of image data;
    an image selecting device including a judging means for judging whether or not a person included in each of a plurality of photograph images represented by each of the plurality of image data has his/her eyes open and a selecting means for selecting a single set of image data representing a photograph image which includes the person who is judged to have his/her eyes open; and
    a storage device for storing the single set of image data selected by the image selecting devices,
    wherein the photographing control device includes a number-of-person counting means for counting a number of persons who will be photographed by the photographing device and an instructing means for instructing the photographing device to increase a number of times of photographing with increase of the number of persons counted by the number-of-person counting means, and
    the number-of-person counting means counts the number of persons who will be photographed in each of the plurality of photograph images, and the instructing means instructs the photographing device to increase the number of times of photographing taken at the predetermined time interval based on the increase of the number of persons counted within a photographing area, simultaneously.

2. An image management system as defined in claim 1, wherein the image selecting device is provided in the photographing device.

3. An image management system as defined in claim 1, wherein, the image selecting device is provided in the storage device.

4. An image management system as defined in claim 1, wherein the predetermined time interval is a time period which is longer than time required for a blink by a person and shorter than time from a blink to the next blink.

5. An image management system comprising:
    a photographing device including a photographing means installed at a fixed point, for obtaining image data representing an image of a person by photographing the person and an output means for outputting the image data;
    a photographing control device for controlling the photographing means so that the photographing means continuously photographs a plurality of times at a predetermined time interval and causing the photographing device to obtain a plurality of image data;
    an image selecting device including a judging means for judging whether or not a person included in each of a plurality of photograph images represented by each of the plurality of image data has his/her eyes open and a selecting means for selecting a single set of image data representing a photograph image which includes the person who is judged to have his/her eyes open; and a storage device for storing the single set of image data selected by the image selecting device, wherein the photographing device detects the person who carries a wireless tag and photographs only the person who carries the wireless tag, and wherein if a number of persons in a predetermined photographing area is less than a predetermined threshold value, the photographing device automatically photographs the persons, and wherein if the number of persons in the predetermined photographing area is equal to or more than the predetermined threshold value, the photographing device manually photographs the persons by using the wireless tag.

6. An image management system as defined in claim 1, wherein the photographing device includes a display means for displaying the image data.

7. An image management system as defined in claim 1, wherein the image storage device is connect to the photographing device via a network.

8. An image management system as defined in claim 1, wherein the image storage device accepts at least one of a request for downloading the image data, a request for creating an album using the image data, a request for creating a CD-R on which the image data are recorded and an order for printing the image data from a terminal device connected to the image storage device via a network.

9. A photography apparatus comprising:

a photographing means installed at a fixed point, for obtaining image data representing an image of a person by photographing the person;

an output means for outputting the image data;

a photographing control means for controlling the photographing means so that the photographing means continuously photographs a plurality of times at a predetermined time interval and causing the photographing device to obtain a plurality of image data;

a counting means for counting the number of human subjects to be photographed; and a instructing means for instructing the photographing means to perform greater number of photography as the number of human subjects counted by the counting means increases, wherein the counting means counts the number of human subjects who will be photographed in each of the plurality of photograph images, and the instructing means instructs the photographing means to increase a number of times of photographing taken at the predetermined time interval based on the increase of the number of human subjects counted within a photographing area, simultaneously.

10. An image management system as defined in claim 1, wherein the photographing means automatically photographs the plurality of times at the predetermined time interval to complete a predetermined number of photographs for obtaining a set of photographs.

11. An image management system as defined in claim 1, wherein the storage device only stores the single set of image data selected by the image selecting device.

12. An image management system comprising:

a photographing device including a photographing means installed at a fixed point, for obtaining image data representing an image of a person by photographing the person and an output means for outputting the image data;

a photographing control device for controlling the photographing means so that the photographing means continuously photographs a plurality of times at a predetermined time interval and causing the photographing device to obtain a plurality of image data;

an image selecting device including a judging means for judging whether or not a person included in each of a plurality of photograph images represented by each of the plurality of image data has his/her eyes open and a selecting means for selecting a single set of image data representing a photograph image which includes the person who is judged to have his/her eyes open; and a storage device for storing the single set of image data selected by the image selecting device, wherein the photographing control device includes a number-of-person counting means for counting a number of persons who will be photographed by the photographing device and an instructing means for instructing the photographing device to increase a number of times of photographing with increase of the number of persons counted by the number-of-person counting means, and wherein the photographing means automatically photographs the plurality of times at the predetermined time interval to complete a predetermined number of photographs for obtaining a set of photographs, and the number-of-person counting means counts the number of persons who will be photographed in each of the plurality of photograph images, and the instructing means instructs the photographing device to increase the number of times of photographing taken at the predetermined time interval within the set of photographs.

13. An image management system as defined in claim 1, wherein the number-of-person counting means counts the number of persons by extracting images of facial parts of the persons included in each of the plurality of photograph images, and counting a number of extracted facial images.

14. An image management system comprising:

a photographing device including a photographing means installed at a fixed point, for obtaining image data representing an image of a person by photographing the person and an output means for outputting the image data;

a photographing control device for controlling the photographing means so that the photographing means continuously photographs a plurality of times at a predetermined time interval and causing the photographing device to obtain a plurality of image data;

an image selecting device including a judging means for judging whether or not a person included in each of a plurality of photograph images represented by each of the plurality of image data has his/her eyes open and a selecting means for selecting a single set of image data representing a photograph image which includes the person who is judged to have his/her eyes open; and a storage device for storing the single set of image data selected by the image selecting device, wherein the judging means judges whether or not each person of a plurality of persons included in each of the plurality of photograph images has his/her eyes open and the selecting means selects a single set of image data representing a photograph which includes each person of the plurality of persons who is judged to have his/her eyes open.

15. An image management system comprising:

a photographing device including a photographing means installed at a fixed point, for obtaining image data representing an image of a person by photographing the person and an output means for outputting the image data;

a photographing control device for controlling the photographing means so that the photographing means continuously photographs a plurality of times at a predetermined time interval and causing the photographing device to obtain a plurality of image data;

an image selecting device including a judging means for judging whether or not a person included in each of a plurality of photograph images represented by each of the plurality of image data has his/her eyes open and a selecting means for selecting a single set of image data representing a photograph image which includes the person who is judged to have his/her eyes open; and a storage device for storing the single set of image data selected by the image selecting device, wherein the photographing device detects the person who carries a wireless tag, and if a number of persons in a predetermined photographing area is less than a predetermined threshold value, the photographing device automatically photographs the persons, and wherein if the number of persons in the predetermined photographing area is equal to or more than the predetermined threshold value, the photographing device manually photographs the persons by using the wireless tag.

* * * * *